United States Patent
Baev et al.

(10) Patent No.: US 7,027,467 B2
(45) Date of Patent: Apr. 11, 2006

(54) FIBER LASER

(75) Inventors: Valeri Baev, Hamburg (DE); Arnold Stark, Hamburg (DE); Stefan Salewski, Stade (DE); Wolfgang Thurau, Hamburg (DE); Peter Toschek, Hamburg (DE)

(73) Assignee: Evotec Technologies GmbH, Dusseldorf (DE)

( * ) Notice: Subject to any disclaimer, the term of this patent is extended or adjusted under 35 U.S.C. 154(b) by 0 days.

(21) Appl. No.: 10/297,510

(22) PCT Filed: Jun. 12, 2001

(86) PCT No.: PCT/EP01/06610

§ 371 (c)(1),
(2), (4) Date: Jun. 2, 2003

(87) PCT Pub. No.: WO01/99243

PCT Pub. Date: Dec. 27, 2001

(65) Prior Publication Data

US 2004/0028091 A1    Feb. 12, 2004

(30) Foreign Application Priority Data

Jun. 20, 2000    (DE) ................. 100 30 259

(51) Int. Cl.
*H01S 3/30*    (2006.01)
*H01S 3/082*    (2006.01)

(52) U.S. Cl. ............................. 372/6; 372/97

(58) Field of Classification Search .......... 372/92–108, 372/6
See application file for complete search history.

(56) References Cited

U.S. PATENT DOCUMENTS

| | | | | | |
|---|---|---|---|---|---|
| 4,560,246 | A | * | 12/1985 | Cotter | 385/27 |
| 4,835,778 | A | * | 5/1989 | Kafka et al. | 372/6 |
| 5,008,887 | A | * | 4/1991 | Kafka et al. | 372/6 |
| 5,134,620 | A | * | 7/1992 | Huber | 372/6 |
| 5,151,908 | A | * | 9/1992 | Huber | 372/6 |
| 5,159,601 | A | * | 10/1992 | Huber | 372/6 |
| 5,200,964 | A | * | 4/1993 | Huber | 372/26 |
| 5,225,925 | A | * | 7/1993 | Grubb et al. | 359/341.32 |

(Continued)

FOREIGN PATENT DOCUMENTS

DE    196 36 236    3/1998

(Continued)

OTHER PUBLICATIONS

"Controllable Dual-Wavelength Operation of a Femtosecond Neodymium Fiber Laser", Ober et al., 2412 Optics Letters, 20 Jan. 15, (1995), No. 2, pps. 195-197.

*Primary Examiner*—Minsun Oh Harvey
*Assistant Examiner*—Phillip Nguyen
(74) *Attorney, Agent, or Firm*—Ohlandt, Greeley, Ruggiero & Perle, L.L.P.

(57) ABSTRACT

A fiber laser with a fiber for laser light generation having an entrance end and an exit end comprises a pump light source for generating pump light to be coupled via the entrance side into the fiber. At the exit end of the fiber a first resonator mirror is provided which is highly reflecting for the laser light to be generated in the wavelength range with the smallest light amplification and to the light of the pump light source. Spaced from the first resonator mirror a second resonator mirror is provided via which light of further wavelength ranges can be fed back into the fiber with the aid of a collimating lens.

29 Claims, 5 Drawing Sheets

U.S. PATENT DOCUMENTS

| | | | |
|---|---|---|---|
| 5,271,024 A * | 12/1993 | Huber | 372/6 |
| 5,295,209 A * | 3/1994 | Huber | 385/37 |
| 5,305,335 A * | 4/1994 | Ball et al. | 372/6 |
| 5,313,477 A * | 5/1994 | Esterowitz et al. | 372/6 |
| 5,323,404 A * | 6/1994 | Grubb | 372/6 |
| 5,327,282 A * | 7/1994 | Takeda et al. | 359/341.5 |
| 5,341,237 A * | 8/1994 | Tohmon et al. | 359/341.5 |
| 5,369,523 A * | 11/1994 | Millar et al. | 359/341.32 |
| 5,430,574 A * | 7/1995 | Tehrani | 359/378 |
| 5,447,075 A * | 9/1995 | Hockaday | 73/862.59 |
| 5,448,657 A * | 9/1995 | Kim et al. | 385/12 |
| 5,511,083 A * | 4/1996 | D'Amato et al. | 372/6 |
| 5,627,848 A * | 5/1997 | Fermann et al. | 372/18 |
| 5,646,951 A * | 7/1997 | Fischer et al. | 372/19 |
| 5,652,756 A * | 7/1997 | Stultz et al. | 372/10 |
| 5,659,644 A * | 8/1997 | DiGiovanni et al. | 385/31 |
| 5,841,099 A * | 11/1998 | Owen et al. | 219/121.69 |
| 5,862,162 A | 1/1999 | Maeda | 372/20 |
| 5,864,645 A * | 1/1999 | Zellmer et al. | 385/126 |
| 5,946,093 A * | 8/1999 | DeFreez et al. | 356/339 |
| 5,966,392 A * | 10/1999 | Chen et al. | 372/22 |
| 6,041,070 A * | 3/2000 | Koch et al. | 372/6 |
| 6,160,568 A * | 12/2000 | Brodsky et al. | 347/247 |
| 6,233,259 B1 * | 5/2001 | Ventrudo et al. | 372/6 |
| 6,263,002 B1 * | 7/2001 | Hsu et al. | 372/6 |
| 6,275,516 B1 * | 8/2001 | Arney et al. | 372/71 |
| 6,320,885 B1 * | 11/2001 | Kawai et al. | 372/6 |
| 6,363,088 B1 * | 3/2002 | Alphonse et al. | 372/6 |
| 6,385,216 B1 * | 5/2002 | Chang et al. | 372/6 |
| 6,389,186 B1 * | 5/2002 | DiGiovanni et al. | 385/12 |
| 6,510,276 B1 * | 1/2003 | Jain et al. | 385/142 |
| 6,556,599 B1 * | 4/2003 | Svilans | 372/20 |
| 6,625,182 B1 * | 9/2003 | Kuksenkov et al. | 372/19 |
| 6,836,488 B1 * | 12/2004 | Bayart et al. | 372/3 |
| 6,882,664 B1 * | 4/2005 | Bolshtyansky et al. | 372/6 |

FOREIGN PATENT DOCUMENTS

| | | |
|---|---|---|
| DE | 197 18 997 | 11/1998 |
| EP | 0 984 532 | 3/2000 |
| JP | 59165488 | 9/1984 |
| JP | 05082881 | 4/1993 |

* cited by examiner

FIBER LASER

FIELD OF THE INVENTION

The invention relates to a fiber laser having a doped optical fiber for laser light generation.

DISCUSSION OF THE BACKGROUND ART

In a fiber laser the laser-active medium is incorporated in a light waveguide. Laser activity of the fiber is attained in particular by doping the fiber core with ions of rare earths. In numerous laser transitions of rare earth ions it was possible for the first time to observe laser emission in fiber lasers, in particular since it has been possible to use, besides silicate glasses, fluorite glasses, above all fluor zirconate glass ZBLAN, as a host material. In contrast to silicate glasses fluorite glasses have smaller effective photon energies, which results in smaller rates of non-radiative decay, longer durations of excited states and larger amplification cross-sections. Fluorite glasses allow high quantum efficiencies and an efficient excitation into elevated energy levels to be attained by absorption out of excited states such that laser emission out of states, in which the excitation energy is larger than the quantum energy of the exciting light (upward conversion laser), is possible.

Active fibers can generally be produced by doping the fiber core with laser-active materials. Here, excitation of the ions is effected via a pump light source for generating pump light to be coupled into the fiber. The pump light is longitudinally irradiated into the fiber such that said light is absorbed by the ions. The pump light is focussed, with the aid of a lens, onto the front side of the fiber, coupled into the fiber core and guided there.

If only a portion of the light coupled into the fiber is absorbed by the corresponding ions, a high-performance pump light source is required for generating an adequate laser intensity. For increasing the efficiency of the laser, i.e. in particular of the amount of absorbed light from the pump light source, it is common practice to feed back into the fiber, with the aid of a mirror, light emerging at the exit end of the fiber, which has not yet been absorbed by the ions contained in the fiber. Further, it is common practice to evaporate the resonator mirror directly onto the fiber end.

Such a fiber laser is e.g. known from DE 196 36 236 A1. The diode laser-pumped multimode waveguide laser comprises a diode laser. With the aid of a collimating optics the light emitted by the diode laser is coupled into the fiber at the entrance end of the fiber. A mirror is evaporated onto the entrance end of the fiber. The mirror reflects the pumping wavelength generated by the diode laser only to a very small extent. However, the mirror arranged at the entrance end reflects the generated laser light extremely well. Thus, at the entrance end of the fiber almost only light with the pumping wavelength can emerge from the fiber. The opposite fiber end, the exit end of the fiber, can be antireflection-coated for the laser wavelength to be generated.

For feeding laser light generated in the fiber back into the fiber, a mirror is arranged in a spaced relationssship to the exit end of the fiber. The light reflected by this resonator mirror is focussed with the aid of a lens disposed between the exit end of the fiber and the resonator mirror and fed back into the fiber.

SUMMARY OF THE INVENTION

It is an object of the invention to provide a fiber laser which allows emission at a plurality of wavelengths. Preferably, the fiber laser is adapted to emit a plurality of wavelengths simultaneously or in a selective and switchable manner. Further, it should preferably be possible to use a low-performance pump light source in connection with the fiber laser.

The fiber laser according to the invention comprises a fiber for laser light generation having an entrance end and an exit end. In particular, this is an active fiber doped with rare earth ions. For coupling pump light via the entrance end into the fiber, a pump light source is provided. The pump light source is e.g. a laser diode. The laser diode preferably generates light with an excitation wavelength or an excitation wavelength range. Further, a resonator unit is provided at the exit end of the fiber for feeding, preferably frequency-selectively, light emerging from the fiber back into the fiber. According to the invention, the resonator unit comprises a first and a second resonator mirror. The first resonator mirror is directly connected with the exit end of the fiber. Said connection can e.g. be realized by depositing the mirror. The second resonator mirror is arranged in a spaced relationship to the exit end of the fiber.

Arrangement of two or more resonator mirrors in a resonator unit at the exit end of the fiber allows laser emission at two or more wavelengths. The first resonator mirror connected with the exit end of the fiber is preferably configured such that it reflects the desired wavelength back into the fiber with the smallest light amplification. With the aid of the second spaced resonator mirror another selected wavelength can then be fed back into the fiber. In this manner, the wavelengths of the light generated by the fiber laser are selected.

The first resonator mirror, which is preferably glued to the exit end of the fiber, is preferably highly reflecting for the generated laser light in the wavelength range with the smallest light amplification and in the range of the pump light. In particular, the reflectivity for the wavelength range of the laser emission amounts to 50 to 99.9%. Particularly preferred is a reflectivity of 80% to 99.1%. As a result, 0.1% to 50%, preferably 0.9% to 20% of the generated laser light can be coupled out. For the pump wavelength the reflectivity preferably amounts to more than 50%, in particular more than 75%. Such a mirror allows laser emission at the weakest transition with the pump light being well utilized.

The second resonator mirror is preferably highly reflecting for another wavelength range. It is thus possible to feed further radiation emitted by the ions back into the fiber and utilize said radiation for exciting the laser emission at additional wavelengths.

Further resonator mirrors may be provided which are highly reflecting for a certain wavelength range and are transparent to or have an extremely low reflectivity in the remaining wavelength ranges. With the aid of such resonator mirrors certain wavelength ranges can thus be controlledly fed back into the fiber. The resonator involved is thus a spectrally staggered multiple resonator. This allows the light losses at the laser transition with the smallest amplification to be minimized and/or the required pumping power to be reduced. The spectrally selective feedback of light by the further mirrors ensures the start of oscillation of the laser oscillator at the other desired wavelengths or wavelength ranges. The invention allows switchable or simultaneous emission at a plurality of laser transitions using a low-performance pump light source, e.g. a laser diode. Another method for generating simultaneous or switchable light emission at a plurality of wavelengths is to controlledly position the first resonator mirror preferably at a distance of up to 3 µm to the end face of the glass fiber. The change in the air gap thus created allows a controlled modification of the spectrum of the fed-back light.

Since the laser light generated by the fiber depends on the wavelength range of the fed-back light, mirrors reflecting different wavelength ranges can be used or exchanged. Preferably, a diaphragm and/or color filter for controlling the wavelength range of the laser light to be generated is arranged upstream of the second or every further resonator mirror. Such an arrangement ensures that e.g. only light with a certain wavelength or a certain wavelength range is fed back by the mirror. It is thus also possible to provide a resonator mirror which is reflecting for a plurality of wavelength ranges, and to select, with the aid of suitable diaphragms, e.g. only one of these color ranges. An adequate control of the diaphragm, the color filter and/or the mirror spacing allows laser light to be generated simultaneously in at least two or more wavelength ranges. This can e.g. be realized by partially covering the resonator mirror. Thus the ratio of the light power of individual wavelength ranges can be set.

Preferably, the resonator unit comprises a collimating lens for setting the wavelength range fed back into the fiber, said collimating lens being longitudinally shiftable relative to the exit end of the fiber. Shifting of the collimating lens allows individual wavelength ranges reflected by the resonator mirror or the resonator mirrors to be coupled into the fiber. The collimating lens can preferably be used in such a way that it serves for controlling the emission in the corresponding wavelength ranges.

Preferably, a coupling-in mirror transparent to the wavelength range of the pump light is provided at the entrance end of the fiber. To allow setting of the efficiency of the radiation amplification in the range of the desired emission wavelength of the fiber, the coupling-in mirror offers, on the side facing the entrance end of the fiber, an adequately high reflectivity to the emission wavelength range of the fiber laser.

Due to the feedback of a portion of the light from the pump light source the properties of the pump light source and thus those of the fiber laser may change. The wavelength range of the pump light is reflected in particular by the first resonator mirror towards the entrance end. The light reflected by the first resonator mirror is not completely absorbed by the ions contained in the fiber. Since the coupling-in mirror at the entrance end of the fiber is transparent to the pumping wavelength, the portion which is not absorbed emerges at the coupling-in mirror in the direction of the pump light source, e.g. the laser diode. This may lead to a modification of the spectrum of the laser diode and, in the case of strong back-reflections due to excessive power increase at the front face of the laser diode, to a reduced service life of the laser diode. Back-reflections further occur at the entrance end of the fiber since the entrance end is not perfectly antireflection-coated such that reflections occur. All types of reflection may not only lead to the described disturbances in the pump light source, such as the laser diode, but also to disturbances in other parts of the fiber laser. For example, a photodiode is normally installed in the housing of the laser diode, said photodiode serving as a power monitor of the fiber laser. The signal of this photodiode will be falsified by the back-reflections.

The aforementioned problem can be solved by an optical insulation or an optical decoupling of the pump light source from the entrance end of the laser. It is common practice to use so-called Faraday insulators for this purpose.

If the fiber does not show any birefringence, an optical insulator can preferably be used, said insulator comprising a polarizing filter and a $\lambda/4$ plate by means of which the linearly polarized beam is completely circularly polarized. During another passage of a reflected beam through the $\lambda/4$ plate towards the pump light source the beam is transformed again. Thereby a linearly polarized beam is created which is rotated by 90° relative to the beam originally emitted by the pump light source. Such a beam can no longer pass through the polarizing filter.

Preferably, in the fiber laser according to the invention the first resonator mirror and/or the coupling-in mirror are provided directly at the corresponding fiber end. For example, it is possible to evaporate a corresponding specular layer onto the fiber end.

Prior to arranging the mirror, e.g. by coating the fiber ends, the fiber ends are preferably enclosed with a material of similar hardness and then polished together with said material. Due to the similar, ideally identical, hardness of the fiber and the material enclosing the fiber an extremely flat plane can be produced. The material enclosing the fiber end is preferably a plastic material which polymerizes when exposed to UV-radiation.

Evaporation of mirrors onto the fiber front faces is however a complicated process. In particular reproduction of numerous identical mirrors is extremely complicated.

An alternative method for producing an extremely flat plane on the fiber front face is to break the fiber, in particular with the aid of a fiber cutting means.

According to the invention, the mirrors arranged on a carrier material are preferably glued to the fiber ends, i.e. to the entrance end and/or the exit end of the fiber. Such glueing of mirrors to the fiber ends of a laser is an independent invention. For example, glueing of mirrors, as described below, can also be effected on conventional fiber lasers or other devices comprising a fiber with aluminized ends.

Preferably, glueing is effected with a low-viscosity adhesive. In particular, the adhesive is a two-component epoxy resin adhesive.

Preferably, the mirror has a plurality of dielectric layers and is produced on a glass substrate, preferably in vacuum. In particular, the mirror comprises two types of layers of different materials arranged in mutually alternating relationship. The two alternating layers are preferably made of hafnium oxide or silicon oxide. In a particularly preferred aspect the first resonator mirror comprises two multilayer subsystems reflecting the laser light or the pump light.

According to the invention, the fiber is preferably doped with at least one rare earth or lanthanite. Preferably, praseodym and/or ytterbium and/or erbium ions are used for doping the fiber. Doping with praseodym ions is preferably effected in the range from 500–5000 ppm, in particular in the range from 2000–3000 ppm. The ytterbium ions, which may be supplied in addition to the praseodym ions, are preferably supplied in a quantity of 5000–50000 ppm, preferably from 10000–30000 ppm.

To allow laser emission in the transverse basic modes, the fiber is preferably configured such that the cut-off wavelength for higher waveguide modes of the fiber is by 5%–15% larger than the shortest laser emission wavelength. The cut-off wavelength characterizes the shortest wavelength which is guided by the fiber only in the transverse basic mode.

Preferably, the pump light source, which is preferably a laser diode, is controlled by a control signal such that the emission power of the fiber laser can be controlled. For this purpose, a control signal is derived from the level of emission power, said signal serving for energizing the pump light source.

A preferred control process is e.g. carried out by applying the following method: After collimation of the light emerging from the fiber, a portion of the laser light (≈33%) is coupled out at a polarization-independent beam splitter. A narrow-band filter focusses this light onto a photodiode. The photodiode signal is electronically amplified, inverted and differentiated. The signal thus processed modulates the laser diode current, wherein the intensity of modulation is settable. The circuit is set up such that a portion of the constant current is guided via a transistor past the laser diode. Due to use of the constant current source with a specified maximum current, the electronic control unit cannot damage the sensitive laser diode. Essential components of the circuit are a photodiode, a load resistor, an amplifier, an inverting differentiator and a transistor energized by an operational amplifier.

Figure 7:
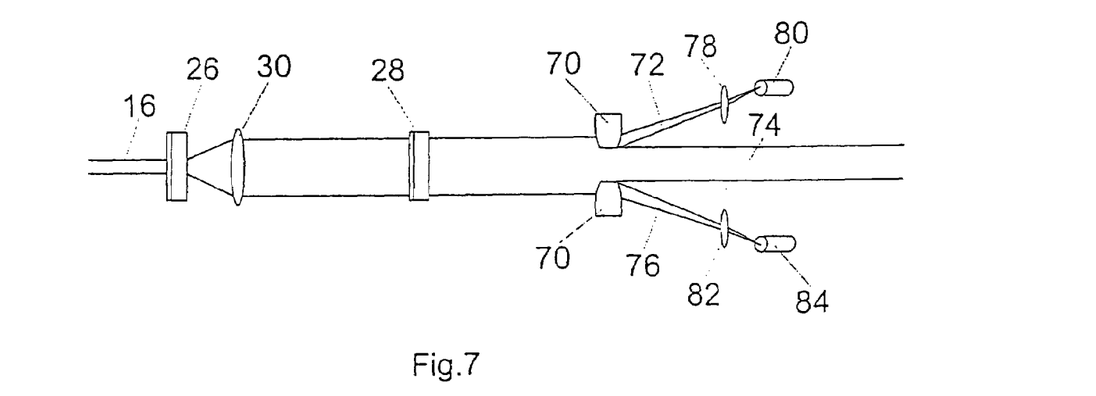
FIG. 7 shows a schematic representation of a coupling-out unit.

A preferred means for the simultaneous generation of two control signals is shown in FIG. 7. For simultaneous two- or multicolor emission of the laser, two or more control channels are required.

Modulation of the laser diode current is to be proportional to the inverted differentiation of the photodiode signal, but the photodiode signal is subjected to an undesired phase shift by the circuit. Since the fiber laser requires a performance check at least up to a limiting frequenzy of 500 kHz, the individual components of the circuit (photodiode with load resistor, amplifier, differentiator) are preferably designed for a limiting frequency of approximately 10 MHz.

Test measurements, during which the photodiode was illuminated by a modulated light-emitting diode, yielded the following results: At a 500 kHz frequency of the performance fluctuations the circuit produced a phase shift of approximately 25°, at lower frequencies correspondingly smaller shifts were produced.

The fiber laser according to the invention is in particular suitable for use as a light source for confocal microscopes, in particular a fluorescence microscope. Such microscopes are particularly well suited for high-capacity screening of chemical and/or biological samples.

BRIEF DESCRIPTION OF THE DRAWINGS

Hereunder the invention is explained in detail on the basis of preferred embodiments with reference to the drawings in which.

DETAILED DESCRIPTION OF THE PREFERRED EMBODIMENT

Figure 1:
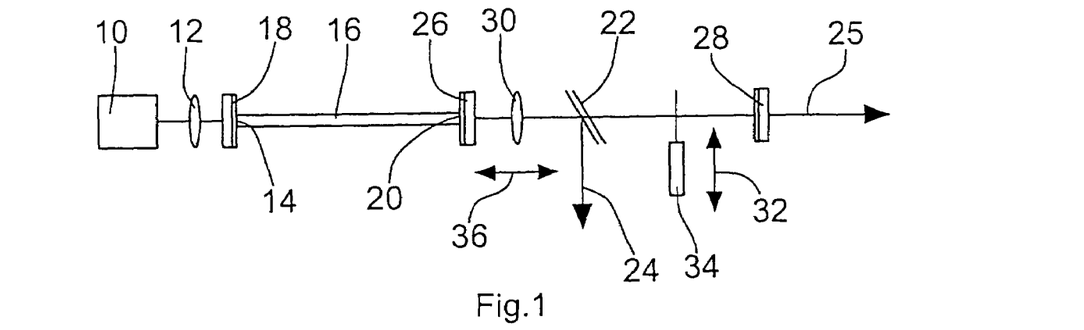
FIG. 1 shows a schematic view of a basic setup of a preferred embodiment of the fiber laser according to the invention.

The fiber laser according to the invention comprises a pump light source 10 which is preferably a laser diode. The light emitted by the pump light source 10 is coupled by a lens 12 into an entrance end 14 of a fiber 16. For this purpose, a coupling-in mirror 18 is provided at the entrance end 14, said mirror preferably being glued to the fiber end.

The laser light coupled into the fiber 16 excites the ions contained in the fiber 16 such that said ions emit laser light with the desired wavelength. The laser light emerges from the fiber at an exit end 20 of the fiber 16 and can be coupled out by a semi-transmitting mirror 22 in the direction indicated by arrow 24 or by a mirror 28 in the direction indicated by arrow 25.

According to the invention, a resonator unit is provided via which a portion of the light emerging from the exit end 20 of the fiber 16 is fed back into the fiber 16. For this purpose, the resonator unit comprises a first resonator mirror 26 which is preferably glued to the exit end 20 of the fiber 16. The first resonator mirror 26 is highly reflecting for the wavelength range of the laser light to be generated and in the range of the pump light. By back-reflection of the pump light back into, the fiber 16 the ions in the fiber 16 are additionally excited. This increases the efficiency of the fiber laser. Light of other wavelengths which is not reflected by the first resonator mirror 26 can be reflected by the second resonator mirror 28 which is preferably reflecting for another wavelength range provided for the generation of laser light. The light reflected by the second resonator mirror 28 is coupled into the exit end 20 of the fiber 16 by a collimating lens 30.

A diaphragm 34 shiftable in the direction indicated by arrow 32 or a color filter makes it possible to determine how much light of the second desired wavelength range is to be fed back into the fiber 16. Shifting of the color diaphragm 34 can be effected by suitable electric and/or magnetic drive units.

Since deflection of the light by the lens 30 depends on the wavelength, it is also possible to define, by shifting the lens 30 in the direction indicated by arrow 36, which wavelength range is to be coupled into the exit end 20 of the fiber 16.

Figure 2:
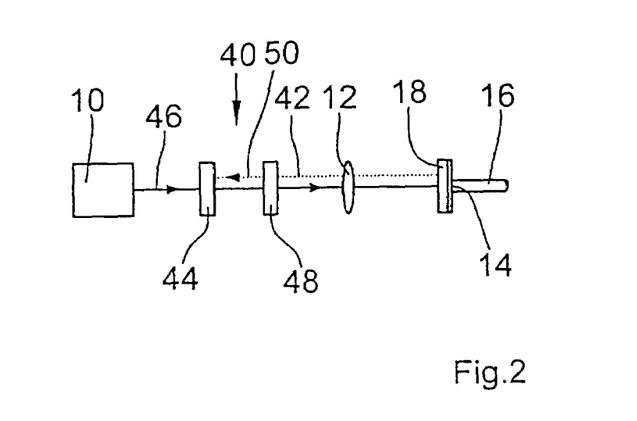
FIG. 2 shows a schematic representation of a preferred embodiment of the optical decoupling means according to the invention.

An optical decoupling means 40 shown in FIG. 2 is arranged between the lens 12 and the pump light source 10. The optical decoupling means 40 serves for preventing back-reflected light beams 42 having the same wavelength as the pump light source 10 from being reflected back into the pump light source 10 and causing disturbances there, e.g. due to adjustment errors, defects in the surface of the mirror 18 and the like.

For this purpose, the decoupling means 40 comprises a polarizing filter 44 arranged downstream of the pump light source as seen in the direction of a light beam 46 emitted by the pump light source 10. The polarizing filter 44 is configured such that the light 46 emitted by the pump light source 10 can unimpededly pass through the polarizing filter 44. Thereafter the light 46 passes through a polarization-changing means 48, such as a λ/4 plate, which circularly polarizes the linearly polarized light 46 emitted by the pump light source 10. A reflected circularly polarized beam 42 passes through the λ/4 plate 48 again thus being linearly polarized. Consequently, the light beam 50 can no longer pass through the polarizing filter 44.

Below a preferred arrangement of the first resonator mirror 26 and the coupling-in mirror 18, respectively, at the exit end 20 and the entrance end 14, respectively, of the fiber 16 is explained in detail with reference to FIGS. 3–6.

For producing the mirrors 18,26 preferably a 0.25 mm–0.5 mm thick slab glass of a high surface quality is used as a substrate. In a commercial evaporation coating plant the substrate is coated with the "hard" layers preferably of $HfO_2$ and $SiO_2$.

In the case of direct aluminizing of the fiber the dielectric layer system is disposed between the glass of the fiber and the ambient air. When the mirror is glued on according to the invention, the layer system is located between the fiber glass and the slab glass. In this case, different layer systems are required than in the case of direct aluminizing. In addition to the laser mirror, which bears upon the polished surface, an antireflection-coating of a thickness of e.g. 850 nm is evaporated onto the other substrate side to eliminate disturbing back-reflections.

Figure 3A:
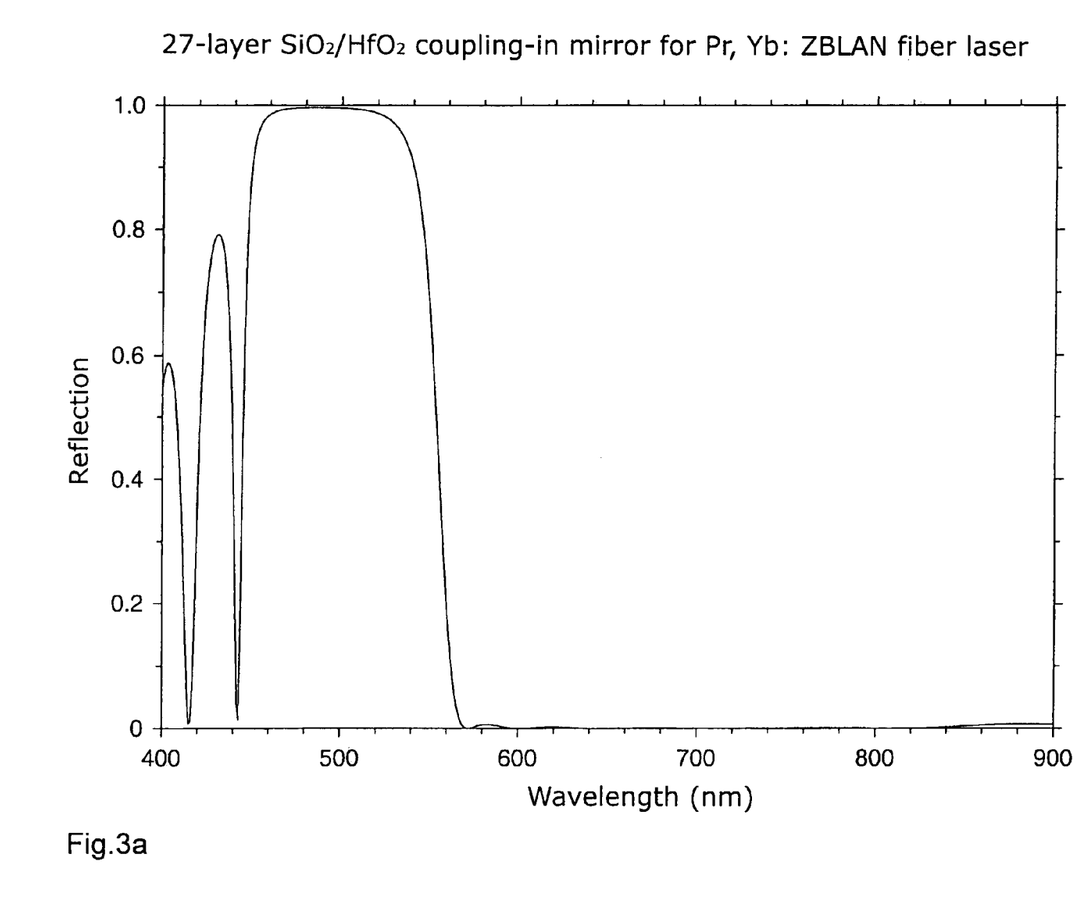
FIGS. 3a and 3b show diagrams of the wavelength versus the reflection of a coupling-in mirror and a coupling-out mirror, respectively.
Figure 3B:
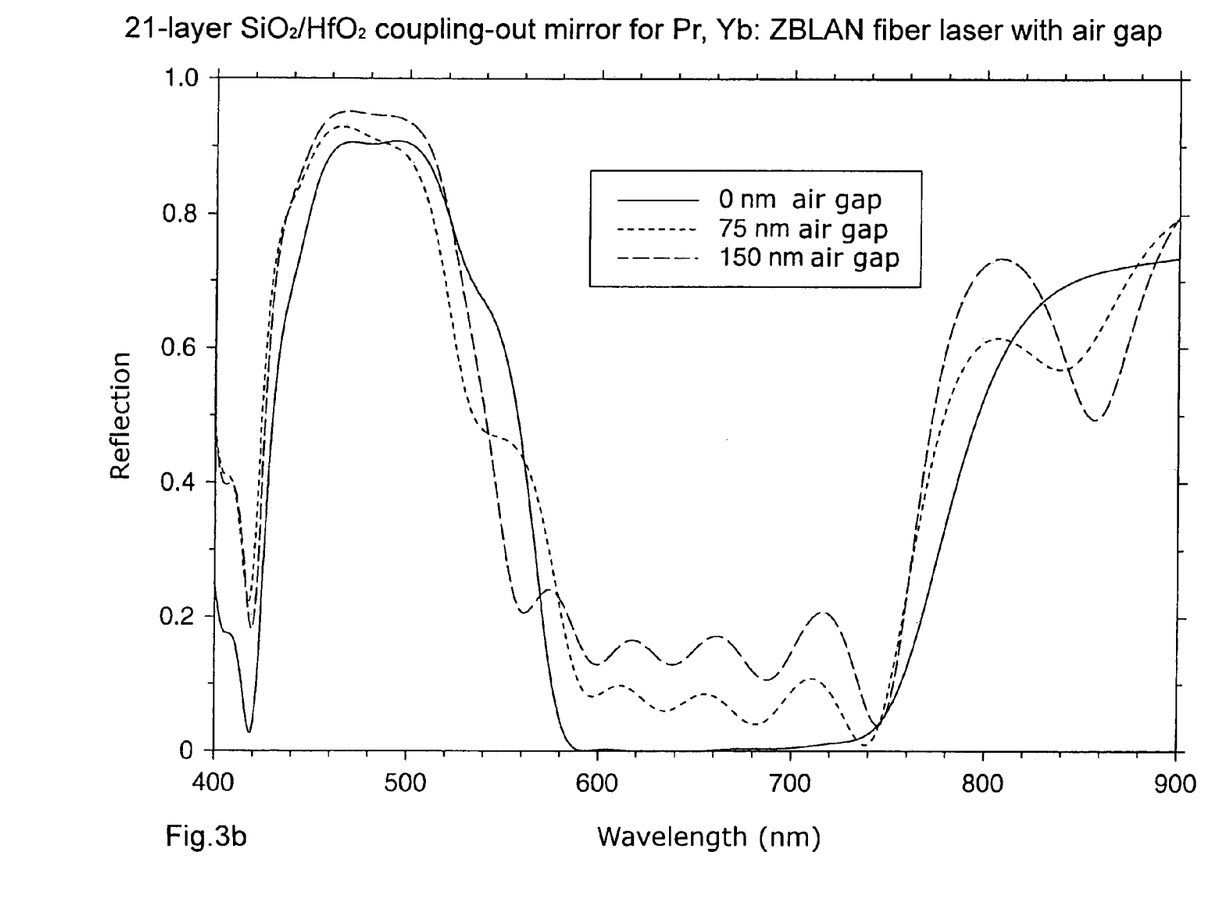
Figure 4:
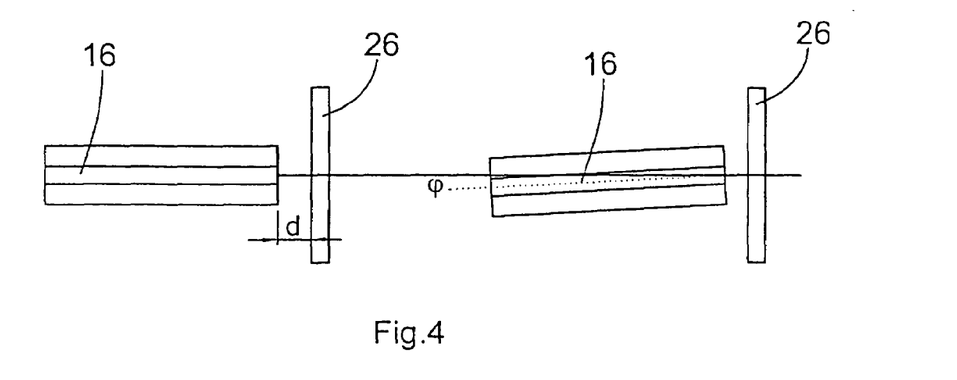
FIG. 4 shows a schematic representation of adjustment problems occurring during attachment of a mirror to a fiber end.

By way of example, a coupling-in mirror with a 0.35% transmission at 491 mm and a coupling-out mirror with a 10% transmission at 491 nm are described below:

FIGS. 3a and 3b show the calculated reflection curves of the two mirrors; the following table shows the series of dielectric layers.

27-Layer $SiO_2/HfO_2$ Coupling-in Mirror for Pr, Yb: ZBLAN Fiber Laser

| No. | Material | Layer thick. | Ref. waveleng. |
|---|---|---|---|
| — | Glas_(n = 1.5) | — | — |
| 1 | $SiO_2$ | $\lambda/4$ | 478 |
| 2 | $HfO_2$ | $\lambda/8$ | 478 |
| 3 | $SiO_2$ | $\lambda/4$ | 478 |
| 4 | $HfO_2$ | $\lambda/4$ | 478 |
| 5 | $SiO_2$ | $\lambda/4$ | 478 |
| 6 | $HfO_2$ | $\lambda/4$ | 478 |
| 7 | $SiO_2$ | $\lambda/4$ | 478 |
| 8 | $HfO_2$ | $\lambda/4$ | 500 |
| 9 | $SiO_2$ | $\lambda/4$ | 500 |
| 10 | $HfO_2$ | $\lambda/4$ | 500 |
| 11 | $SiO_2$ | $\lambda/4$ | 500 |
| 12 | $HfO_2$ | $\lambda/4$ | 500 |
| 13 | $SiO_2$ | $\lambda/4$ | 500 |
| 14 | $HfO_2$ | $\lambda/4$ | 500 |
| 15 | $SiO_2$ | $\lambda/4$ | 500 |
| 16 | $HfO_2$ | $\lambda/4$ | 500 |
| 17 | $SiO_2$ | $\lambda/4$ | 500 |
| 18 | $HfO_2$ | $\lambda/4$ | 500 |
| 19 | $SiO_2$ | $\lambda/4$ | 500 |
| 20 | $HfO_2$ | $\lambda/4$ | 500 |
| 21 | $SiO_2$ | $\lambda/4$ | 478 |
| 22 | $HfO_2$ | $\lambda/4$ | 478 |
| 23 | $SiO_2$ | $\lambda/4$ | 478 |
| 24 | $HfO_2$ | $\lambda/4$ | 478 |
| 25 | $SiO_2$ | $\lambda/4$ | 478 |
| 26 | $HfO_2$ | $\lambda/8$ | 478 |
| 27 | $SiO_2$ | $\lambda/4$ | 478 |
| — | Fib. (n = 1.5) | — | — |

21-Layer $SiO_2/HfO_2$ Coupling-Out Mirror for Pr, Yb: ZBLAN Fiber Laser

| No. | Material | Layer thickn. | Ref. wavelength |
|---|---|---|---|
| — | Glas. (n = 1.5) | — | — |
| 1 | $HfO_2$ | $\lambda/4$ | 967 |
| 2 | $SiO_2$ | $\lambda/4$ | 967 |
| 3 | $HfO_2$ | $\lambda/4$ | 834 |
| 4 | $SiO_2$ | $\lambda/4$ | 834 |
| 5 | $HfO_2$ | $\lambda/4$ | 911 |
| 6 | $SiO_2$ | $\lambda/4$ | 911 |
| 7 | $HfO_2$ | $\lambda/4$ | 867 |
| 8 | $SiO_2$ | $\lambda/4$ | 867 |
| 9 | $HfO_2$ | $\lambda/4$ | 467 |
| 10 | $SiO_2$ | $\lambda/4$ | 467 |
| 11 | $HfO_2$ | $\lambda/4$ | 489 |
| 12 | $SiO_2$ | $\lambda/4$ | 489 |
| 13 | $HfO_2$ | $\lambda/4$ | 489 |
| 14 | $SiO_2$ | $\lambda/4$ | 489 |
| 15 | $HfO_2$ | $\lambda/4$ | 500 |
| 16 | $SiO_2$ | $\lambda/4$ | 500 |
| 17 | $HfO_2$ | $\lambda/4$ | 500 |
| 18 | $SiO_2$ | $\lambda/4$ | 500 |
| 19 | $HfO_2$ | $\lambda/4$ | 444 |
| 20 | $SiO_2$ | $\lambda/4$ | 444 |
| 21 | $HfO_2$ | $0.631*\lambda/4$ | 444 |
| (22) | Air | 0 to 3 µm | — |
| — | Fib. (n = 1.5) | — | — |

The reflection curve of the layer systems meets the requirements for blue laser operation. The coupling-in mirror displays a reflectivity of 99.65% at 491 nm and a low reflectivity at 570–900 nm.

The coupling-out mirror displays a reflectivity of 90% at 491 nm, a reflectivity of approximately 70% at 850 nm and a low reflectivity at 590–700 nm. An air gap (layer 22) changes the spectral reflection curve as a function of its thickness (FIG. 3b). At a thickness of 75 nm the reflectivity at 635 nm is approximately 7% and at 150 nm approximately 14%. Another increase in the air gap thickness causes a decrease and an increase in the reflectivity. Adjustment of the air gap thickness thus allows emission of laser light in the desired spectral range.

From the coated substrates having a diameter of 25 mm numerous small laser mirrors can be produced. One mirror each is attached to the fiber plug, adjusted and fixed.

The described concept combines the advantages offered by direct evaporation with those offered by exchangeable external aluminizing: The aluminized fiber is a compact unit which is easy to integrate into optical setups. On the other hand, the mirrors are easy to exchange, which is of advantage if e.g. the output power of the fiber laser is to be optimized. The spectral properties of all mirrors produced from one and the same substrate are identical.

Methods for precise adjustment and fixing of the small mirrors to the fiber plug have been developed and are described below.

In a fiber laser having mirrors glued to the fiber end faces undesired losses occur if the mirrors do not perfectly bear upon the fiber. For optimum feedback, the light reflected back to the fiber must have the same beam diameter and the same position and beam axis as the original fiber mode. Hereunder, the losses which occur as a consequence of two types of maladjustments are assessed.

If a gap of a thickness d exists between the fiber 16 and the mirror 18 or 26, or if the mirror is tilted relative to the fiber end face (FIG. 4), losses occur since the emerging beam expands and can no longer be completely coupled back into the core. If the air gap d (FIG. 4) between the fiber 16 and the mirror 26 is e.g. one micrometer, losses of approximately 3% occur. If the mirror is further tilted at an angle φ=1° relative to the fiber 16, the additional losses amount to 6%. If the losses are to remain in the magnitude of 1%, a spacing of 0.5 μm and a tilt of 0.4° may not be exceeded. If the emission spectrum of the laser is to be set by selecting the air gap thickness, the preferred setting range is 0–0.5 μm.

The hard layers evaporated onto the mirror withstand the high power densities (>100 MW/cm$^2$ at 491 nm and 850 nm). Degradation and shrinking processes which change the reflection behaviour are not observed.

The undesired change in the spectral reflection curve caused by the air gap can be eliminated by placing immersion oil (n≈1.5) into the gap.

The residual inaccuracy of the adjustment of the mirror spacing should lie in the magnitude of the wavelength of the visible light. The required accuray can be attained by utilizing effects of interference with visible light. These effects help to recognize structures which are smaller than the wavelength of the light used.

Figure 5:
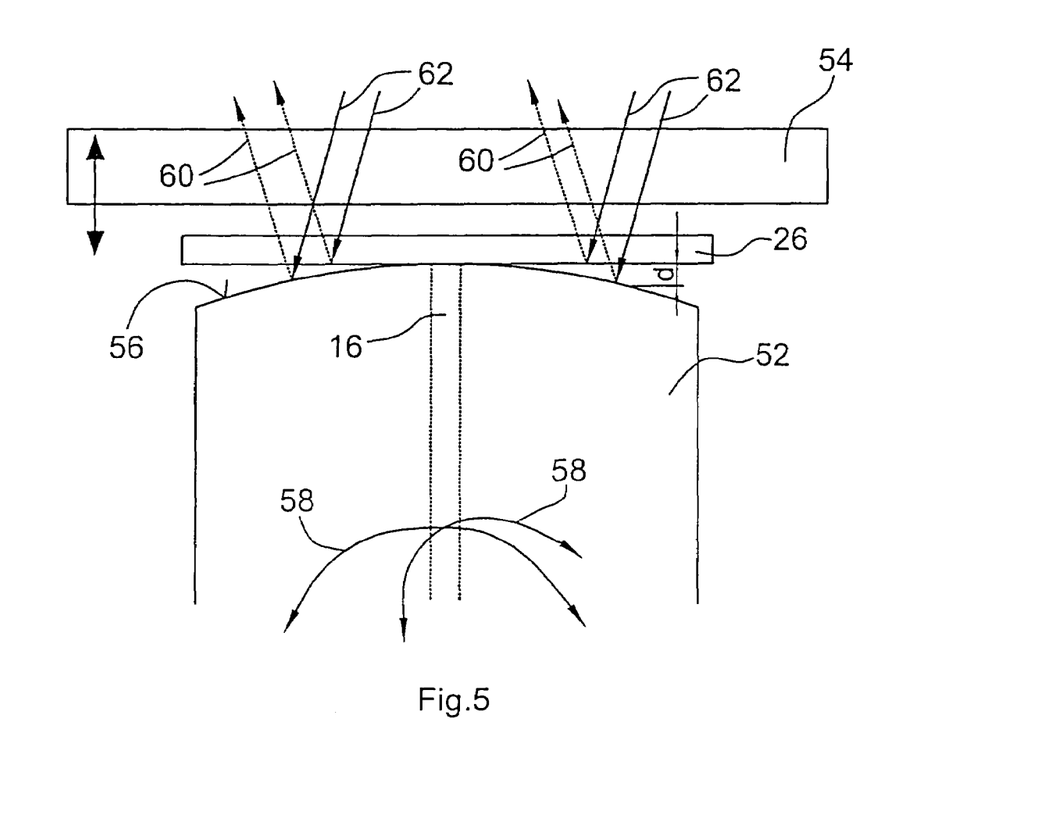
FIG. 5 shows a schematic representation of a setup for adjusting a mirror at a fiber end.

For example, interferences of the light reflected by the mirror surface and the fiber end face (60 and 61, respectively), the so-called "Newton's rings" can be used to minimize the tilt and the spacing between mirror and fiber axis.

For very small gap thicknesss destructive interferences exist such that in the case of supported mirror and vertical viewing, the interference pattern has a minimum of zero order at the support location. Since for a constructive interference the path difference must be an integer multiple of half the wavelength, the gap thickness in the maximum of the first bright circular interference fringe amounts to just λ/4. Thus the interference pattern allows good evaluation of the gap thickness. If the plate is tilted, the support location and thus the position of the ring system changes. In the case of known radius of curvature of the convex surface the tilt can also be assessed.

For utilizing the Newton's rings the following preferred setup has been developed: The interference structure occurs between the polished slightly convex surface of a fiber plug 52 containing the fiber 16 and the dielectric mirror evaporated onto a plane glass substrate 26.

The fiber plug 52 is fixed in a mirror holder which allows angular adjustment. Onto the polished surface 56 of the plug 52 a small mirror fragment 26 is placed. The glass plate 54 which is mounted to an x-y-z shifting table is used to press the mirror 26 in position. The support location of the mirror 26 on the plug 52 is adjusted by tilting the plug 52. The adjustment work is checked by observing the interferences with a binocular microscope which is directed to the front side of the fiber plug 52. The dashed arrows 60 represent light emitted in the direction of the microscope, and the arrows shown as continuous lines 62 represent the light from an illumination means. The contrast of the developing interference pattern depends on the type of incident light and the reflecting properties of the interfaces. For attaining a high contrast of the interference pattern the two interfaces must display equivalent reflecting properties and the light must be monochromatic.

For adjustment purposes preferably two light sources are used: For the adjustment work the quasi-monochromatic light of a sodium vapor lamp is used. Coupled into a flexible glass fiber bundle, the light can be guided such that the fiber end face is almost vertically illuminated. A halogen lamp serves for illumination of the setup and localization of the glass fiber in the ceramic plug.

When the mirror 26 is adjusted, it is glued to the plug 52.

Figure 6:
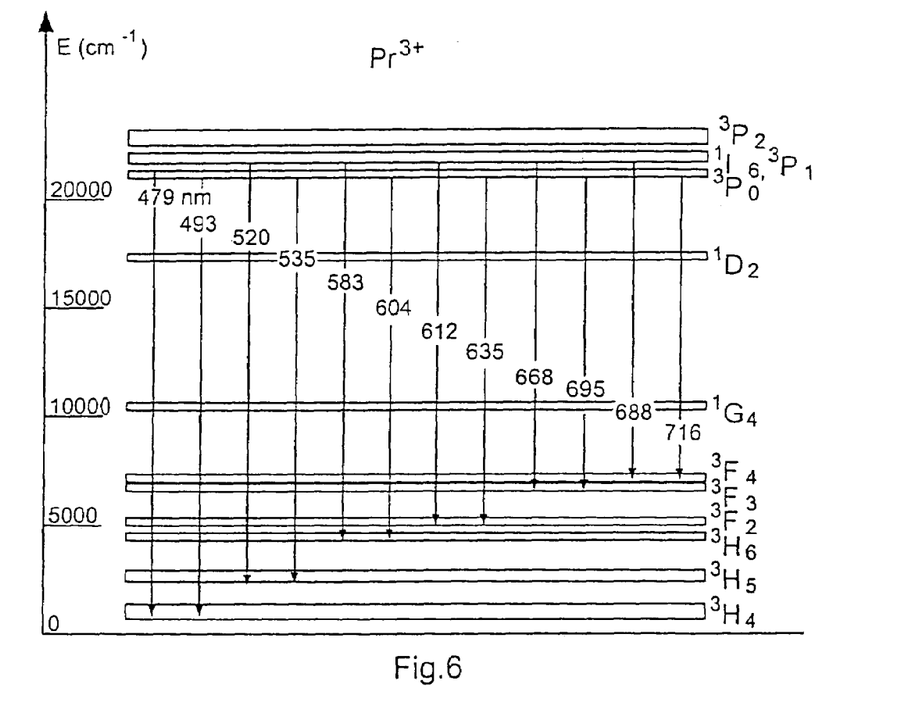
FIG. 6 shows a term diagram of praseodym in an host material ZBLAN.

Hereunder the advantages of the use of praseodym as the rare earth added to the fiber 16 are explained in detail with reference to FIG. 6.

The trivalent praseodym ion in the host material ZBLAN offers 12 laser transitions in the visible range. The multitude of the colors makes praseodym an extremely preferred ion for laser emission in a plurality of spectral ranges, the more so as besides monochrome emission a switchable and synchronous polychromatic emission is also possible. In FIG. 6 the energy levels and visible transitions of praseodym in ZBLAN are plotted: All visible transitions start from the two thermally coupled levels $^3P_0$ and $^3P_1$.

FIG. 7 shows how two separate control signals for the emission in the two colors can be derived from the dichromatic radiation of the fiber laser. For this purpose, a spherical lens 30 and an external feedback mirror 28 are provided on the coupling-out side, i.e. shown in FIG. 8 on the right of the coupling-out mirror 26. A collimated laser beam passes through the feedback mirror 28, said laser beam impinging on a split lens 70. The split lens produces three ray bundles 72,74,76. The ray bundle 72 impinges onto a color filter 78 which is blue in the embodiment described. The portion of the ray bundle 72 passing through the color filter impinges onto a photodiode 80. Correspondingly, the ray bundel 76 impinges onto a color filter 82 which is red in the embodiment described, and the portion of the ray bundle 76 passing through the color filter 82 impinges onto a photodiode 84.

The invention claimed is:

1. A fiber laser comprising:
   a fiber for laser light generation having an entrance end and an exit end,
   a pump light source for generating pump light provided to be coupled via said entrance end into said fiber, and
   a resonator unit provided at said exit end of said fiber, wherein said resonator unit comprises a first resonator mirror connected with said exit end, and a second resonator mirror arranged in spaced relationship to said exit end, said second resonator mirror being adapted for feeding light of at least one wavelength range emerging at said exit end back into said fiber.

2. The fiber laser according to claim 1, wherein said first resonator mirror is highly reflecting for the wavelength range of said pump light.

3. The fiber laser according to claim 1, wherein said first resonator mirror is highly reflecting for the wavelength range with the smallest light amplification of said laser light to be generated.

4. The fiber laser according to claim 1, wherein said second resonator mirror is highly reflecting for at least one further wavelength range to which said first resonator mirror is essentially transparent such that said laser light is generated in this further wavelength range.

5. The fiber laser according to claim 1, wherein a color filter for controlling said wavelength range of said laser light to be generated is arranged upstream of said second resonator mirror.

6. The fiber laser according to claim 1, wherein said resonator unit comprises at least one further resonator mirror arranged in the beam path behind said second resonator mirror.

7. The fiber laser according to claim 6, wherein at least one further resonator mirror reflects at least one wavelength range to which said resonator mirror or said resonator mirrors arranged in the beam path upstream of said first resonator mirror are essentially transparent.

8. The fiber laser according to claim 1, wherein said resonator unit comprises a shiftable collimating lens for adjusting said wavelength range fed back into said fiber.

9. The fiber laser according to claim 1, further comprising a coupling-in mirror transparent to said wavelength range of said pump light is disposed at said entrance end of said fiber.

10. The fiber laser according to claim 9, wherein said coupling-in mirror is highly reflecting for the at least one emission wavelength range of said fiber.

11. The fiber laser according to claim 1, further comprising an optical decoupling means disposed between said pump light source and said entrance end of said fiber.

12. The fiber laser according to claim 11, wherein said optical decoupling unit comprises a polarizing means.

13. The fiber laser according to claim 12, wherein said polarizing means comprises a polarizing filter arranged downstream of said pump light source, said polarizing filter being transparent to the pump light emitted by said pump light source, and a polarization-changing means arranged downstream of said polarizing filter such that said pump light emerging from said entrance end of said fiber or pump light reflected near said entrance end is polarized such that said pump light cannot pass through said polarizing filter.

14. The fiber laser according to claim 13, wherein said polarization-changing means is a λ/4 plate.

15. The fiber laser according to claim 1, wherein said entrance end and said exit end are enclosed by a material, said material and said entrance and exit ends having a similar hardness to one another.

16. The fiber laser according to claim 1, wherein said mirrors are multilayered dielectric mirrors.

17. The fiber laser according to claim 16, wherein said multilayered dielectric mirrors comprise at least two layers formed from at least two different and alternately arranged materials.

18. The fiber laser according to claim 1, wherein said fiber is doped with between about 500 to 5,000 ppm praseodym ions.

19. The fiber laser according to claim 1, wherein said fiber is doped with between about 5,000 to 50,000 ppm Ytterbium ions.

20. The fiber laser according to claim 1, wherein the cut-off wavelength for higher waveguide modes of said fiber is between about 5% to 15% larger than the shortest laser emission wavelength.

21. The fiber laser according to claim 1, wherein a control signal is generated from the intensity of the emission power of said fiber laser which controls said emission power of said fiber laser by energizing said pump light source.

22. The fiber laser according to claim 1, wherein a gap (d) between said fiber entrance and exit ends and said first and second resonator mirrors is filled with a medium having an index of refraction near that of said fiber.

23. The fiber laser according to claim 1, wherein said fiber comprises a numerical aperture between about 0.25 to 0.35.

24. The fiber laser according to claim 2, wherein said first resonator mirror has a reflectivity is greater than 50% for the wavelength range of said pump light.

25. The fiber laser according to claim 24, wherein said first resonator mirror has a reflectivity greater than 75% for the wavelength range of said pump light.

26. The fiber laser according to claim 3, wherein said first resonator mirror has a reflectivity of between about 50% to 99.9%, such that between about 0.1% to 50% of said generated laser light wavelength range is coupled out.

27. The fiber laser according to claim 26, wherein, said first resonator mirror has a reflectivity of between about 80% to 99.1%, such that between about 0.9% to 20% of said generated laser light wavelength range is coupled out.

28. The fiber laser according to claim 18, wherein said fiber is doped with between about 2,000 to 3,000 ppm praseodym ions.

29. The fiber laser according to claim 19, wherein said fiber is doped with between about 10,000 to 30,000 ppm Ytterbium ions.

* * * * *